3,460,310
CONTAINER CLOSURES
Edmund Philip Adcock, Felcourt, and Joan Ann Stanley, Dunstable, England, assignors to United Glass Limited, Staines, Middlesex, England, a corporation of Great Britain
Filed Dec. 6, 1965, Ser. No. 511,897
Claims priority, application Great Britain, Dec. 9, 1964, 50,087/64; Feb. 12, 1965, 6,292/65
Int. Cl. B67b 3/22, 5/00; B29c 27/12
U.S. Cl. 53—39          13 Claims

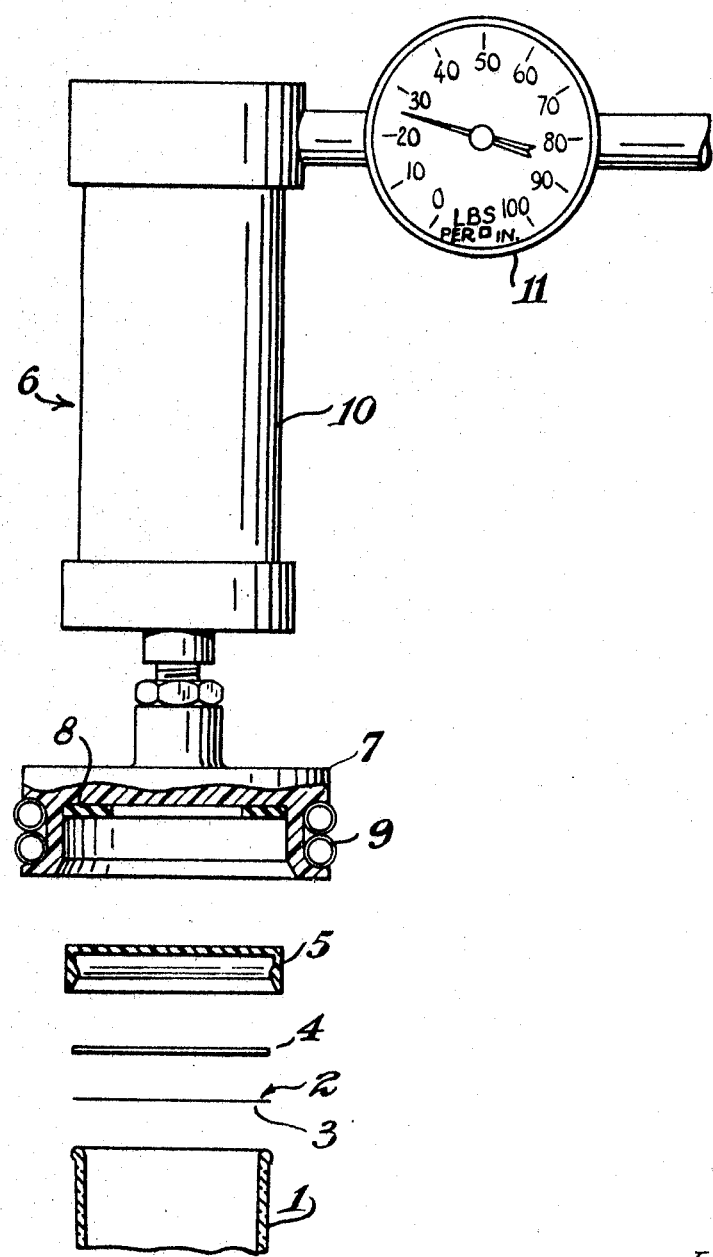

ABSTRACT OF THE DISCLOSURE

Method of sealing a container mouth with a metal foil membrane bonded to the container finish. The membrane is readily stripped away by the user to leave the finish unimpaired and ready for re-sealing. The method is to use such a membrane which is coated with a thermoplastic and press the membrane over the container mouth, while simultaneously subjecting the membrane to high frequency induction heating. The temperature and pressure conditions are such as to ensure that the membrane is readily strippable and that the finish is not impaired.

---

The present invention relates to a process for applying sealing membranes to containers, and to a device for carrying out the process.

It is known that products such as dried milk powders and instant coffee powders, when placed in containers, require to be sealed by means of membrane that prevents the ingress of both moisture and gases and that also has tamper-proof properties. The conventional method of effecting this seal is to fit the closure caps with waxed pulpboard pads or wads to which are lightly heat-sealed double glassine membranes. In the course of application of the closure caps, the sealing surfaces or finishes (i.e. the mouths) of the containers are first made adhesive by passing them under glue-coated rollers. Caps are then applied to the containers, and, after the adhesive has had time to dry out, the caps are unscrewed and the membranes part from the waxed pads and remain adhered to the finishes of the containers. In those cases where metal foil membranes are provided on metal cans or tins, the membranes may be crimped in place.

It is, of course, essential that the membranes are intact when the closure caps are removed from the containers, thus providing evidence that the contents of the containers have not been tampered with. Membranes applied by means of adhesively coating the container finish possess the disadvantage that the adhesive takes some time to dry and the resultant water vapour is absorbed by the contents of the container. It is also difficult for the efficiency of the operation to be inspected at the end of the packing line.

This disadvantage has been overcome to a certain extent by a process which applies a flat disc of adhesive-backed metal foil cold to the finish of the container by the impact of a punch to attach it lightly, subjects it to the action of a heated pressure member to cause it to adhere to the glass, and then completes the capsuling by pressure alone applied by a resiliently mounted pressing member. This process also has its disadvantages, however, since it has to be carried out in three stages with three different pressing members, with the result that the sealing efficiency is impaired due to the heat not being applied at the same time as the resilient pressing member.

The crimping of metal foils to metallic tins or cans also has disadvantages, for instance filling disadvantages and the fact that the seal is not perfectly hermetic.

These disadvantages of sealing membranes removably to containers have been great enough for a suggestion to have been made of completely fusing a thermoplastic membrane to a container of thermoplastic material, this being effected by an inductive heating method. Such is far too drastic a sealing method for most purposes, since the seal cannot be broken without damaging or distorting the container neck, and this makes re-sealing or re-use difficult or impossible.

It is the object of the present invention to provide a method for applying membranes, both metallic and non-metallic, to containers, also metallic or non-metallic, which will give a hermatic gas-tight seal, which may be carried out in a single stage, which, in one embodiment, may be accompanied by the application of a closure cap, and which may lend itself to the highest closuring speeds attainable. Such membranes are to be readily removable without damaging or distorting the container.

According to the present invention a process for applying a sealing membrane to a container, wherein either the membrane or the container or both is or are of metal, comprises placing the membrane under sealing pressure onto the container finish (i.e. the lip or rim of the mouth) and heating the metal of the membrane or container finish by means of an induced radio ferquency current to a temperature sufficient to soften a thermoplastic material coated on or present in the material of the membrane, or coated on the material of the container finish, whereby the membrane is removably adhered to the container without distortion of the container.

By means of the process of the invention, metallic or non-metallic membranes may be applied to metallic or non-metallic containers, provided that either the membrane or the container in each instance is metallic. For instance, the process of the invention may be used to apply a metal membrane to a metal container, a glass container, a ceramic container, or a synthetic plastic container.

When the container is of metal and the membrane applied thereto is of metal, either the membrane or the finish of the container may have the coating of a thermoplastic material. When the membrane and the finish of the container are heated by the induced radio frequency current the thermoplastic material softens sufficiently to adhere the membrane to the container.

When the metal membrane is being applied to a glass or synthetic plastic container, again either the membrane or the finish of the container may have the coating of a thermoplastic material. In the case of a synthetic plastic container, to avoid distortion of the container the thermoplastic coating must have a melting point lower than the material of the container.

By means of the invention also membranes of non-metallic material may be applied to metal containers. For instance, a paper membrane may be applied to a metal container by applying to the membrane or to the finish of the container the thermoplastic heat sealing coating. As before, this coating softens sufficiently to adhere the membrane to the container when the container finish is heated by the induced radio frequency current. Again, a thermoplastic membrane may be applied to a metal container, and here it is not absolutely necessary, although it may be sometimes desirable, to use a coating of thermoplastic adhesive.

Normally containers provided with sealing membranes are also supplied with closure caps, although this is not always the case. The closure caps may also be provided with resilient wads such as pulp board or composition cork wads. Basically there are two types of closure cap for use with such containers as the present invention involves, and these may be classified broadly as the "snap-on" type and the "screw-on" type. The screw-on type may have a continuous thread for engagement with a corresponding thread on the container neck, or it may be provided with a series of lugs which engage a rim on the container neck or co-operate with a multi-start thread formed on the container neck. The screw-on type caps may be formed from metal, synthetic thermosetting materials such as urea-formaldehyde resins, and synthetic thermoplastic materials such as polystyrene, high density polythene and polypropylene.

The snap-on type caps are normally formed from metal or flexible plastic material, but can be formed of paper.

When a screw-on plastic closure cap is used, the cap may be fitted with a resilient wad and the metal foil membrane. The cap may then be screwed on to the container to develop sealing pressure on the membrane, after which the radio frequency heating current will be induced into the foil membrane. It is possible for the resilient wad and the metal foil membrane to be formed as a unitary article. For instance a sheet of wad material, e.g., composition cork, may be stuck to a sheet of metal foil, and then discs may be cut from the laminate so formed. It is important, however, that the bond between the wad and the foil membrane should be less than that between the membrane and the container, so that on removing the closure cap, the wad parts from the membrane and may be used to reseal the container when the membrane has been discarded. It is to be noted that if a resilient wad is not used the foil membrane should be provided with a backing of paper or the like so that the membrane does not adhere to the inside of the closure cap.

When a snap-on plastic or paper closure cap is used, a particular advantage of the invention is that the cap, a wad, for example of pulpboard, and the membrane may all be applied to the container at the same time.

As mentioned, the sealing members may be metallic or non-metallic. It may be of any metallic foil, but we have found that aluminum foil is the most economical, and tin foil also makes a very good membrane. Another example is a tin-antimony foil. Before selecting the metal for the membrane consideration should, of course, be had to the contents of the container to be sealed. The metal of the membrane must be inert with respect to the contents of the container. The thickness of the foil membrane should be as thin as possible consistent with it being free from pin holes and readily handleable. Normally this will be between 0.025 and 0.05 millimeters. Non-metallic membranes include, inter alia, those made from paper, glassine, polythene, polypropylene, polystyrene, polyvinylchloride, styrene copolymers, cellulose acetate, polycarbonate, and phenoxy resins.

When it is required not to use a separate closure cap, it being sufficient for the container to be closed by the membrane only, the membrane may have the form of a disc, to seat on the container finish, with a continuous flange on the periphery of the disc for engagement with the container below its finish.

The thermoplastic coating may be, for example, of a vinylite resin, a natural or synthetic wax, or a microcrystalline wax mixture. It may also be of polythene or polypropylene, or one of the many heat sealing coatings which are readily available, and which consist substantially of mixtures of plastic materials and resins. Examples include those which are sold under the trade names "Telstic," "Delseal," "Imseal," "Thermostik" and "Elvax." The thermoplastic material may be coated on the whole of the underside of the membrane, or it may be coated in the form of an annular ring on the periphery thereof. The former is preferred when the membranes are stamped in large numbers from sheet material, since the sheet material may suitably be coated beforehand.

Plastic containers onto which membranes may be sealed by means of the present invention include those made from polythene, polyvinylchloride, polystyrene, styrene copolymers, for example acrylo-nitrile-butadiene-styrene copolymers, polypropylene, cellulose acetate, polycarbonates and phenoxy resins such as high molecular weight polyhydroethers.

Since the sealing surfaces of containers are rarely uniform enough to ensure even adhesion over the whole of the rim of the container, a suitable tool for use in applying sealing pressure to the membrane, and to the closure cap and pulpboard wad when such are used, includes a pad of resilient insulating material. This may conveniently be in the form of an annulus corresponding to the sealing surface of the container. The tool is made of electrically insulating material, and suitably it is this tool which is provided with the source of radio frequency current. This may, for instance, be a coil or series of coils surrounding the sealing head of the tool, the coils being water cooled so that they do not heat up to any appreciable extent. No separate pressing tool is required when sealing pressure is provided by a plastic screw-on cap. The resilient sealing pressure, which is most important if the membrane is to bed down properly on the container finish, is there provided by the resilient wad in combination with the screw cap.

The insulating material of which the sealing head is made may be that sold under the trade mark "Tufnol." The resilient pad may be of any insulating material which has resilient properties, for instance natural and synthetic rubbers, foamed and expanded rubbers, polyurethanes and other plastic materials, natural cork and composition cork.

The invention is illustrated by means of the accompanying drawing, which is an exploded, part sectional elevation of an apparatus for applying, simultaneously, a membrane, a pulpboard wad, and a closure cap to a container.

Referring to the drawing, there is shown a glass jar 1 to which is to be applied a sealing brane of aluminium foil 2 having a coating of thermoplastic adhesive on its underside 3, a pulpboard wad 4, and a snap-on closure cap 5. The vertically reciprocable pressing tool, designated generally 6, comprises a chuck of insulating material 7, a resilient rubber ring or annulus 8, and water-cooled radio frequency heating coils 9 surrounding the chuck 7. The apparatus also comprises an air press 10 and a pressure gauge 11.

In practice, the membrane 2, the pulpboard wad 4 and the closure cap 5 are pressed against the container finish by means of the tool 6, whereafter the radio frequency current is switched on immediately the tool has attained its prescribed capping pressure. The aluminium foil is heated by means of the radio frequency eddy currents induced in it, and this causes the thermoplastic coating to become soft and thus to cause adhesion. Furthermore, this heating of the foil inherently improves the bond between the foil and its thermoplastic coating. The heating time is normally of very short duration, generally considerably less than 1 second. We have found a frequency of about 2 megacycles/sec. and a power source of between 1½ and 10 kw. to be very satisfactory.

It should be noted that the heat sealing operation described herein may be carried out by a simple manually-controlled machine, or it can be effected by incorporating extra machinery into a single-or multi-head semi- or fully-automatic capping machine. For instance, a plurality of capping heads such as that illustrated may be used, or a single capping head mounted on an intermittently rotating table. Again, especially when plastic screw-on closure caps are applied to the containers, the containers may be fitted with their membranes and screw-on caps and passed, on a conveyor belt, through a continuous induced radio frequency field. This last method permits very high speeds to be attained.

What we claim is:

1. A method of sealing a container mouth by bonding to the container finish a metal foil membrane, comprising coating a metal foil membrane with a thermoplastic material, pressing said coated membrane against the container finish at least at the interface with the container finish, the pressure being insufficient to deform the container finish, and, while maintaining such pressure, subjecting the membrane to an elevated temperature such that the temperature of the thermoplastc coating is brought to above its softening point but below its melting point and the temperature of the material of the container finish being maintained below its softening point, said elevated temperature being produced by high frequency induction heating acting to improve the bond between the metal foil membrane and the thermoplastic coating material to assure that said membrane is readily strippable away and leaves the container finish unimpaired.

2. A method as claimed in claim 1 wherein pressure is applied to the membrane through the intermediary of resilient material.

3. A method as claimed in claim 2 wherein the container is of glass.

4. A method as claimed in claim 1 wherein the membrane is in the form of a simple flat disc having a diameter substantially equal to the outside diameter of the container finish.

5. A method as claimed in claim 4 wherein pressure is applied to the membrane through the intermediary of resilient material.

6. A method as claimed in claim 5 wherein the container is of glass.

7. The process of claim 1 wherein the said heating is accomplished in less than 1 second.

8. The process of claim 1 wherein the metal foil has a thickness between 0.025 and 0.05 millimeters.

9. The purpose of claim 1 wherein the thermoplastic coating is selected from vinyl resins, wax, polythene, polypropylene and mixtures thereof.

10. A method according to claim 1 wherein the said metal foil membrane is in the form of a simple flat metal foil disc and the disc is coated with a thermoplastic material at least on its peripheral interface with the container finish.

11. A method of sealing a container mouth by bonding to the container finish a metal foil membrane comprising coating a metal foil membrane with a thermoplastic material, applying said coated metal foil membrane over the container mouth, the said membrane being coated at least at the interface with the container finish, applying a cap over the container mouth to press the membrane against the container finish, the pressure being insufficient to deform the container finish, and passing the capped container through a high frequency induction field to provide induction heating of the coated metal foil membrane and acting to improve the bond between the coated metal foil membrane and the thermoplastic coating material to assure that said membrane is readily strippable away and leaves the container finish unimpaired, the temperature of the thermoplastic coating being brought to above its softening point but below its melting point and the temperature of the material of the container finish being maintained below its softening point.

12. A method as claimed in claim 11 wherein a resilient wad is included between the cap and the metal membrane.

13. A method as claimed in claim 11 wherein the container is of glass.

References Cited

UNITED STATES PATENTS

| | | | |
|---|---|---|---|
| 3,119,216 | 1/1964 | Held | 53—39 |
| 3,290,856 | 12/1966 | Rumberger | 53—39 |
| 2,457,758 | 12/1948 | Vore. | |
| 2,542,702 | 2/1951 | Prow | 53—39 X |
| 2,551,402 | 5/1951 | Vinson | 219—10.53 X |
| 2,775,676 | 12/1956 | Granberry et al. | 219—10.53 |
| 2,937,481 | 5/1960 | Palmer | 53—39 |
| 3,067,653 | 11/1962 | Lesser et al. | 53—39 X |
| 3,142,601 | 7/1964 | Polk et al. | 219—10.53 X |
| 3,232,811 | 2/1966 | Coulter et al. | 219—10.53 X |

FOREIGN PATENTS 969,658    9/1964    Great Britain.

THERON E. CONDON, Primary Examiner

N. ABRAMS, Assistant Examiner

U.S. Cl. X.R.

53—329; 156—69, 272; 215—40; 219—10